THOMAS HOLMES.
Improvement in Cake Mixers

No. 118,243.          Patented Aug. 22, 1871.

Witnesses:
Chas. Nida
Francis McA...

Inventor:
Thos. Holmes

Attorneys.

118,243

UNITED STATES PATENT OFFICE.

THOMAS HOLMES, OF WILLIAMSBURG, NEW YORK.

IMPROVEMENT IN CAKE-MIXERS.

Specification forming part of Letters Patent No. 118,243, dated August 22, 1871.

*To all whom it may concern:*

Be it known that I, THOMAS HOLMES, of Williamsburg, in the county of Kings and State of New York, have invented a new and useful Improvement in Cake-Mixer; and I do hereby declare that the following is a full, clear, and exact description thereof, which will enable others skilled in the art to make and use the same, reference being had to the accompanying drawing forming part of this specification.

Figure 1:
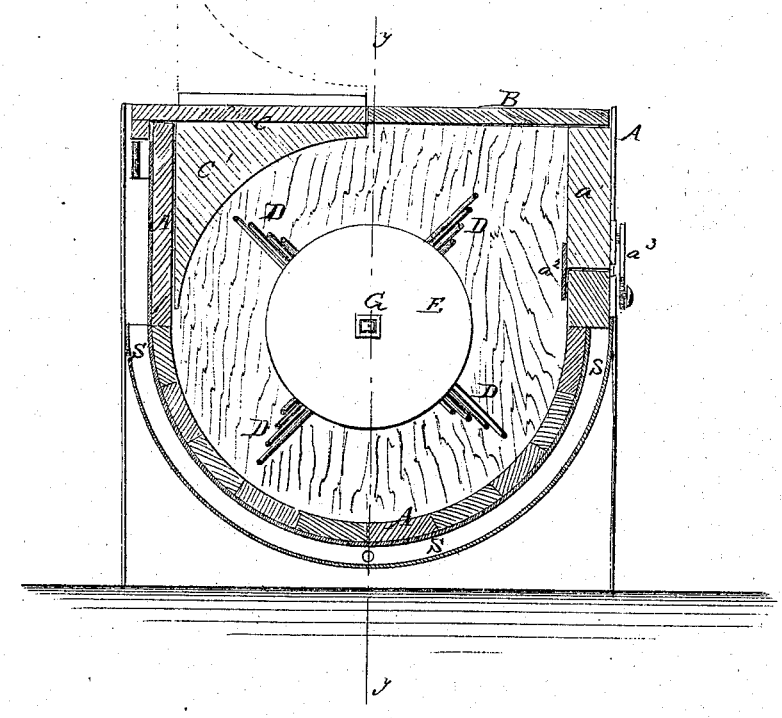
Figure 2:
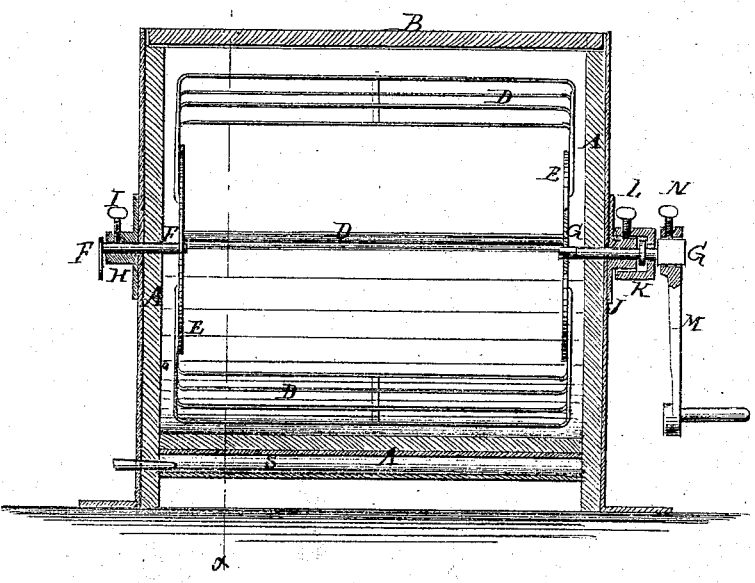

Figure 1 is a vertical cross-section of my improved machine taken through the line $x\ x$, Fig. 2. Fig. 2 is a vertical longitudinal section of the same, taken through the line $y\ y$, Fig. 1.

My invention consists in a sponge-cake mixer, improved, as hereinafter fully described and subsequently pointed out in the claim.

A is the box of the mixer, which is made with vertical ends, a semi-cylindrical bottom, and vertical sides. The upper part $a^1$ of the forward side is made detachable for convenience in taking out the dough, its ends sliding in grooves in the ends of said box. The seam between the lower edge of the movable part $a^1$ and the upper edge of the stationary part of the said side is covered by a plate, $a^2$, attached to the said movable part, and overlapping the said stationary part, to prevent the dough from working out through said seam. The movable part $a^1$ is held down to its place, when in use, by a hook and catch, $a^3$, or other convenient fastening. B C is the cover of the mixer, which is made in two parts. The forward part B of the cover is made flat, as shown in Figs. 1 and 2. The rear part C is made with a downwardly-projecting part, $c'$, formed upon or attached to it, which is concaved to correspond with the curvature of the bottom of the box A, as shown in Fig. 1, and which is designed to prevent the dough, when mixing stiff dough, from lodging in the upper rear part of the box. When mixing thin dough the part $c'$ of the cover C is not needed. In this case the part C may be inverted, as shown in dotted lines in Fig. 1, or it may be laid aside and replaced by a flat cover similar to the forward part B. The bottom of the box A is made double to form a space, S, to receive warm water when the dough requires to be warmed, which water may be poured in at an opening at the rear side of the machine, and drawn off through a hole in the lower part of one end. D are sets of wire loops, each succeeding loop of each set being made a little longer than the preceding loop, so that the horizontal parts of said loops may be a little distance apart, said horizontal parts being strengthened and stiffened by short cross-bars attached to their middle parts. The ends of the several sets of loops D are attached to disks E. In the center of one of the disks E is formed a round hole to receive the end of the journal F upon which the said disk revolves. In the center of the other disk E is formed a square hole to receive the squared end of the journal G, so that the stirrer D E may be revolved by said journal. The journal F passes in through a socket, H, attached to the end of the box A, where it is secured in place by a set-screw, I, as shown in Fig. 2. The journal G revolves in a socket, J, that is attached to the end of the box A, and said journal is swiveled to a cap, K, that fits upon the said socket J and is secured in place by a set-screw, L, as shown in Fig. 2. To the projecting outer end of the journal G is attached a crank, M, which is secured to said journal by a set-screw, N, as shown in Fig. 2. By this construction, by partially withdrawing the journals F G, the stirrer D E may be conveniently removed from the box A. The stirrer D E is designed for use in mixing sponge-cake and other thin doughs.

Having thus described my invention, I claim as new and desire to secure by Letters Patent—

The box A $a^1$, plate $a^2$, cover B C $c'$, wire loops D, disks E, journals F G, sockets H J, screws I L N, cap K, and crank M, all combined, constructed, and arranged, as and for the purpose specified.

The above specification of my invention signed by me this 13th day of June, 1871.

THOMAS HOLMES.

Witnesses:
JAMES T. GRAHAM,
T. B. MOSHER.